E. J. SMITH.
ANIMAL OILING DEVICE.
APPLICATION FILED SEPT. 19, 1912.

1,057,588.

Patented Apr. 1, 1913.

Witnesses
L. C. Paley
A. G. Hague

Inventor.
Elsworth J. Smith.
by Orwig & Dur Atty's

UNITED STATES PATENT OFFICE.

ELSWORTH JOSIAH SMITH, OF HASTINGS, IOWA.

ANIMAL-OILING DEVICE.

1,057,588.   Specification of Letters Patent.   Patented Apr. 1, 1913.

Application filed September 19, 1912. Serial No. 721,310.

*To all whom it may concern:*

Be it known that I, ELSWORTH J. SMITH, a citizen of the United States, residing at Hastings, in the county of Mills and State of Iowa, have invented a certain new and useful Animal-Oiling Device, of which the following is a specification.

The object of my invention is to provide an animal oiling device of simple, durable, and inexpensive construction which may be readily installed for use and so constructed and arranged that when the animal rubs against the operative parts of the device, oil or insecticide of any kind is raised from a receptacle in the lower part of the device, and is rubbed on the animal.

A further object is to provide such a device by which the surplus oil is returned to the oil receptacle, thereby avoiding waste.

My invention consists in certain details, in the construction, arrangement and combination of the various parts of the device whereby the objects contemplated are attained, as hereinafter set forth, pointed out in my claims and illustrated in the accompanying drawings, in which—

Figure 1:
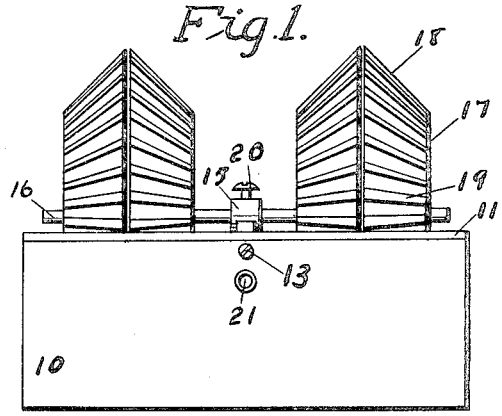
Figure 2:
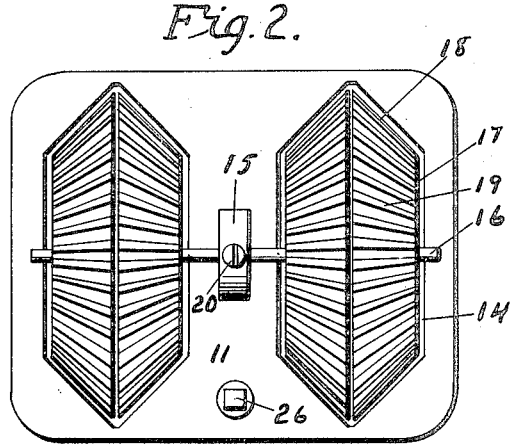
Figure 3:
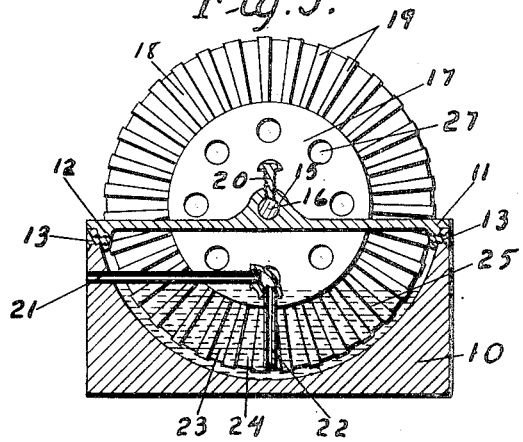

Figure 1 shows a front elevation of an animal oiling device embodying my invention. Fig. 2 shows a top or plan view of the same. Fig. 3 shows a central, transverse, vertical, sectional view of my improved animal oiling device.

In the accompanying drawings I have used the reference numeral 10 to indicate the receptacle for oil which forms the base of my animal oiling device, and is provided preferably with a flat bottom to rest on the ground or other support. The receptacle 10 is provided with a cover or bridge 11 having a downwardly extending flange 12 designed to be received in the upper end of the receptacle 10. The flange 12 and the receptacle 10 are provided with suitable openings which register with each other and are designed to be detachably secured together by means of screws 13 received in said openings. The openings in the flange 12 are preferably screw threaded. The top 11 is provided with openings 14 preferably two in number, each of which is of suitable shape to receive the lower halves of the respective pairs of oil delivering wheels hereinafter described.

In the middle of the top 11 is an upwardly extending lug 15 having a transverse opening therein designed to form a bearing to receive an axle 16 which extends transversely across the machine above the openings 14. Mounted upon the axle 16 with their lower halves received in respective openings 14 are pairs of oil delivering wheels 17. At their peripheries the wheels 17 are provided with inclined flanges 18, the flanges of each pair of wheels being inclined toward each other and spaced apart from each other a short distance at their outer edges. The outer surface of each flange 18 is provided with a series of corrugations or ribs 19 for carrying oil. The wheels 17 are rotatably mounted on the shaft 16 and the shaft 16 may be secured against rotation in the lug 15 by means of a set screw 20.

Mounted in the wall of the receptacle 10 and extending from the outside thereof approximately to the center of the receptacle between the pairs of wheels 17 is a pipe 21 on the inner end of which is a downward extension 22, the lower end of which is near the bottom of the receptacle 10. The pipe 21 is considerably below the top of the receptacle 10. In the top of the cover 11 is a screw threaded opening for filling the device, which opening is ordinarily closed by a screw plug 26. In each of the wheels 17 I provide a plurality of openings 27 to permit the free flow of oil between the wheels.

In the practical use of my improved animal oiling device I preferably place a small amount of water 24 in the receptacle 10, filling it perhaps to the line 23, and then put in a suitable quantity of oil 25. It will readily be seen that when an animal rubs against any of the wheels 17, the wheels will be rotated on the shaft 16, and that oil will be carried up to the upper portion of the wheels on the ribs 19. The animal rubs the part which is affected, and oil will be delivered from the wheels to the animal. If the animal rubs between the two pairs of wheels, both sides of its neck or other part in engagement with the wheels will be thoroughly oiled. I preferably use crude oil in my device. I provide the pipes 21 and 22 to take care of over-flow in case the device should be filled with water by rain or the like.

When the device is installed containing oil, and water is poured into it, the oil remains on top, and when the water reaches the height of the pipe 21 it will flow out through the pipes 22 and 21 thereby preventing the loss of oil.

The advantages of my improved animal oiling device are numerous.

The whole device may be made at a comparatively small expense, and is preferably made of metal. The size may be made to suit the convenience and desires of the owner. The wheels 17 are provided with inclined flanges 18 and are arranged in pairs with the edges of the flanges adjacent to each other so as to admit as little water to the interior of the receptacle 10 as possible.

The device may be readily taken apart for cleaning, storage, transportation or repairs.

I have found in the practical operation, that the device thoroughly oils the animal enabling me to rid the animal of lice and other vermin.

It will be seen that all surplus oil remaining on the wheels will flow back into the receptacle 10. Should the device be left in the hog yard, a heavy fall of rain will not cause loss of oil.

It will be understood that a number of variations may be made in the details of the construction of my device without departing from the essential features thereof as defined in the appended claims.

I claim as my invention:

1. In a device of the class described, a receptacle, a shaft mounted above said receptacle, a pair of wheels rotatably mounted on said shaft with their lower portions received in said receptacle, said wheels being provided with adjacent, inclined, corrugated flanges.

2. In a device of the class described, a receptacle, a shaft mounted above said receptacle, a pair of wheels rotatably mounted on said shaft with their lower portions received in said receptacle, said wheels being provided with adjacent, inclined, corrugated flanges, and a detachable cover mounted on said receptacle and provided with an opening of suitable size to receive said wheels.

3. In a device of the class described, a receptacle, a shaft detachably mounted above said receptacle, pairs of wheels mounted on said shaft with their lower portions extending into said receptacle, adjacent beveled flanges on the pairs of wheels provided with outwardly extending ribs, a cover detachably mounted on said receptacle and provided with openings of suitable size to receive said wheels, said cover being provided with an inlet opening, and means for closing said opening.

4. In a device of the class described, a receptacle, a shaft detachably mounted above said receptacle, pairs of wheels rotatably mounted on said shaft, the respective wheels of each pair being provided with adjacent beveled flanges, said flanges being provided with a plurality of ribs, each of said wheels being formed with a plurality of openings, a horizontal tube extending through the wall of said receptacle below the top thereof into said receptacle, and provided with a portion extending downwardly to a point near the bottom of the receptacle.

Des Moines, Iowa, September 10, 1912.

ELSWORTH JOSIAH SMITH.

Witnesses:
WALTER L. SCOTT,
D. M. COOK.